United States Patent [19]

Isozumi et al.

[11] Patent Number: 4,862,027

[45] Date of Patent: Aug. 29, 1989

[54] COAXIAL STARTER MOTOR

[75] Inventors: Shuzoo Isozumi; Keiichi Konishi, both of Himeji, Japan

[73] Assignee: Mitsubishi Denki Kabushiki Kaisha, Tokyo, Japan

[21] Appl. No.: 288,930

[22] Filed: Dec. 23, 1988

[30] Foreign Application Priority Data

Dec. 23, 1987 [JP] Japan .............................. 62-326015

[51] Int. Cl.[4] ...................... H02K 7/10; H02K 49/00; F02N 11/00

[52] U.S. Cl. ........................................ 310/99; 310/83; 290/48; 74/6; 74/7 R; 74/7 A; 74/7 E; 74/7 C

[58] Field of Search ...................... 310/83, 99; 290/48; 74/6, 7 R, 7 A, 7 E, 7 C; 123/179 R

[56] References Cited

U.S. PATENT DOCUMENTS

| | | | |
|---|---|---|---|
| 2,333,765 | 11/1943 | Celio | 74/7 A |
| 2,578,094 | 12/1951 | Sears | 74/7 A |
| 4,327,300 | 4/1982 | Hoven | 310/75 C |
| 4,671,125 | 6/1987 | Yabunaka | 74/7 E |
| 4,695,735 | 9/1987 | Tallis | 290/38 R |
| 4,712,451 | 12/1987 | Morishita | 74/801 |
| 4,760,274 | 7/1988 | Isozumi | 290/48 |
| 4,800,766 | 1/1989 | Isozumi | 74/7 E |
| 4,808,836 | 2/1989 | Isozumi | 290/48 |

FOREIGN PATENT DOCUMENTS

| | | | |
|---|---|---|---|
| 63-90666 | 4/1988 | Japan | 290/48 |

*Primary Examiner*—Patrick R. Salce
*Assistant Examiner*—C. LaBalle
*Attorney, Agent, or Firm*—Sughrue, Mion, Zinn, Macpeak and Seas

[57] ABSTRACT

A coaxial starter motor comprising a d.c. motor having a hollow rotary shaft extended forward and a planetary speed reduction gear having a sun gear disposed on the outer periphery of the rotary shaft. The starter motor comprises an over-runing clutch of which inner sleeve rotates in one direction and is provided at the inner circumference with helical splines, the over-runing clutch being disposed on the front side of the rotary shaft and rotated at a reduced speed by the planetary gear speed reduction gear. Also provided is an output sleeve mounted on the front end portion of the rotary shaft and having a pinion at its front end portion and axially movably and relatively rotatably supported by a bearing, in which helical splines formed close to the rear portion of the outer periphery is in mesh with helical splines of the inner sleeve. A solenoid switch is disposed on the rear end portion of the d. c. motor, the solenoid switch having an excitation coil, a plunger electromagnetically moved forward when a current flows through the excitation coil, a movable rod connected to the plunger and extenidng into a hollow bore of the rotary shaft to oppose the front wall inner surface of the output sleeve at its front end, the movable rod being moved forward by the forward movement of the plunger to move forward the output sleeve, and a movable contact engagable with a stationary contact by the forward movement of the movable rod for supplying an electrical power to the armature.

6 Claims, 4 Drawing Sheets

COAXIAL STARTER MOTOR

BACKGROUND OF THE INVENTION

This invention relates to a coaxial starter motor and more particularly to a coaxial starter motor with a planetary speed reduction gear.

In FIG. 1 in which the conventional engine starter motor is illustrated in a longitudinal sectional view, reference numeral 1 designates an armature of a d.c. motor, and an armature coil 3 is wound on an armature iron core 2 and connected to a commutator 4. The armature comprises a rotary shaft 5 on which the armature iron core 2 and the commutator 4 are secured. Magnetic poles 6 made of permanent magnets are secured to a yoke 7. A rear bracket 8 and a front bracket 9 are mounted to the yoke 7. A brush holder 10 supporting electric brush is mounted to the rear bracket 8 by bolts 11. The rear end of the rotary shaft 5 is supported by a bearing 12 attached to the rear bracket 9.

The starter motor comprises a planetary gear speed reduction unit 13 composed of a spur gear 14 which is a sun gear formed on the front side circumference of the rotary shaft 5, a stationary frame 15 fixed to the front bracket 10 and has an inner gear 16 formed on the inner circumference of its large-diameter portion, and planetary gears which are in mesh with the spur gear 14 and the inner gear 16 and which are rotatably supported by a support pin 18 and a bearing 19 mounted on the flange portion 21 formed at the rear end portion of the output shaft 20 to rotate around the spur gear 14 while it is spinning.

The output shaft 20 has formed helical splines 22 on its outer circumference and its front end is supported by the front bracket 9 through a bearing 23 while its rear end supports the rotary shaft 5 through a bearing 24. Between a central bore of the front end of the rotary shaft 5 and a recess in the rear end of the rotary shaft 5, a steel ball 25 is disposed to support thrust load in two directions. The rear portion of the output shaft 20 is supported by a bearing 26 supoorted by the stationary frame 15, a stopper 27 is rotatably but axially immovably fitted around the output shaft 20 by a stop ring 28.

The starter motor also comprises an over-running clutch 29 for transmitting the rotation of the output shaft 20. The over-running clutch 29 comprises a clutch outer member 30 which has helical splines 31 formed in its inner circumference and which axially movably engages the helical splines 22 and a clutch inner member 32 to which the rotation is unidirectionally transmitted through rollers 34. The clutch inner member 32 has a pinion 33 on its outer end. A stop ring 35 mounted to the clutch outer member 30 and a bearing 36 for supporting the clutch inner member 32 relatively rotatably and axially movably with respect to the output shaft 20.

The starter motor also comprises a solenoid switch 37 which comprises a case 38 which is mounted to the front bracket 9 and serves as a yoke. With in the case 38, an excitation coil 39 wound on a bobbin 40 made of synthetic resin is disposed, and a stationary iron core 41 is fixed at the rear end of the case 38. A movable iron piece or a plunger 42 is biased by a return spring 43 to the forward position. The plunger 42 supports a movable rod 44 for movement therewith. Also provided are an insulating cap 45 mounted on the outer end of the case 38, a support rod 46 axially movably supported in the stationary iron piece 41 and biased toward the forward position by a compression spring 47, a movable contact 48 mounted on the support rod 46 by an insulating member 49 and biased by a compression spring 50, and a stationary contact 51 mounted on the insulating cap 45 by a nut 52 so as to correspond to the movable contact 48.

Further, the starter motor comprises an electrical conductor 53 connected between the stationary contact 51 and the brush holder 10, a shift lever 54 supported at its center by the front bracket 9 and rotatably connected at its upper end to the movable rod 44. The shift lever 54 has a folked end which engages the engagement ring 35 of the over-running clutch 29. The rotation of the shift lever 54 causes the forward or backward movement of the engagement ring 35.

When it is desired to start the engine, an ignition switch (not shown) is turned on to energize the excitation coil 39 thereby to magnetically attract the plunger 42 to the stationary iron core 41. This causes the movable contact 48 to be brought into contact with the stationary contact 51 to rotate the armature 1. The rotation of the armature 1 is transmitted from the rotary shaft 5 to the planetary gear speed reduction unit 13 and then the speed-reduced rotation is tranmitted to the over-running clutch 29.

On the other hand, the rearward movement of the plunger 42 causes the shift lever 54 to be rotated counterclockwise to move forward the over-running clutch 29, whereby the pinion 33 is brought into mesh with a ring gear (not shown) of the engine flywheel to start the engine.

With the conventional starter motor of the arrangement as above described, the solenoid switch 37 is mounted above the yoke 7 of the motor, enevitably increasing the height of the starter motor, disadvantageously requiring a relatively large space for installation. Also, an output shaft 20 which is in series with the rotary shaft 5 is neccessary, so that the structure is complicated, and numbers of the parts must be precision machined for an accurate coaxial assembly of the two shafts. Further, since the shift lever 54 is neccessary to move the over-running clutch 29 forward or backward, which increases the number of the parts and the space for installing it.

Since the front bracket 9 is disposed close to the pinion 33, the an installation limitation is imposed upon the connection between the pinion 33 and the ring gear of the engine. Also, the inner sleeve 32 is disposed around the outer circumference of the output shaft 20, so that changing of the outer diameter or the number of the teeth of the pinion 33 is severly limited.

SUMMARY OF THE INVENTION

Accordingly, one object of the present invention is to provide an engine starter motor which is compact in size.

Another object of the invention is to provide a starter motor small in height and requires only a relatively small installation space.

Still another object of the invention is to provide a starter motor in which the number of components is reduced making assembly easy.

Still another object of the invention is to provide a starter motor from which an output shaft and a shift lever are eliminated.

A further object of the invention is to provide a starter motor in which modification of the outer diameter and/or the number of teeth of the pinion can be relatively easily achieved.

With the above objects in view, the coaxial starter motor of the present invention comprises a d.c. motor having a hollow rotary shaft extended forward and a planetary speed reduction gear having a sun gear disposed on the outer periphery of the rotary shaft. The starter motor comprises an over-runing clutch of which inner sleeve rotates in one direction and is provided at the inner circumference with helical splines, the over-runing clutch being disposed on the front side of the rotary shaft and rotated at a reduced speed by the planetary gear speed reduction gear. Also provided is an output sleeve mounted on the front end portion of the rotary shaft and having a pinion at its front end portion and axially movably and relatively rotatably supported by a bearing, in which helical splines formed close to the rear portion of the outer periphery is in mesh with helical splines of the inner sleeve. A solenoid switch is disposed on the rear end portion of the d. c. motor, the solenoid switch having an excitation coil, a plunger electromagnetically moved forward when a current flows through the excitation coil, a movable rod connected to the plunger and extending into a hollow bore of the rotary shaft to oppose the front wall inner surface of the output sleeve at its front end, the movable rod being moved forward by the forward movement of the plunger to move forward the output sleeve, and a movable contact engagable with a stationary contact by the forward movement of the movable rod for supplying an electrical power to the armature.

When the excitation coil of the solenoid switch is energized, the movable contact is brought into contact with the stationary contact to energize the electric motor. The rotation of the motor armature shaft is reduced by the planetary gear speed reduction unit and transmitted to the output sleeve to rotate it. At the same time, the plunger of the solenoid swtich is moved forward to push forward the movable rod until it abuts against the inner surface of the front end inner surface of the output sleeve. This causes the pinion to be brought into mesh with the ring gear of the engine flywheel.

BRIEF DESCRIPTION OF THE DRAWINGS

The present invention will become more readily apparent from the following detailed description of the preferred embodiments of the present invention taken in conjunction with the accompanying drawings, in which.

DESCRIPTION OF THE PREFERRED EMBODIMENTS

Figure 1:
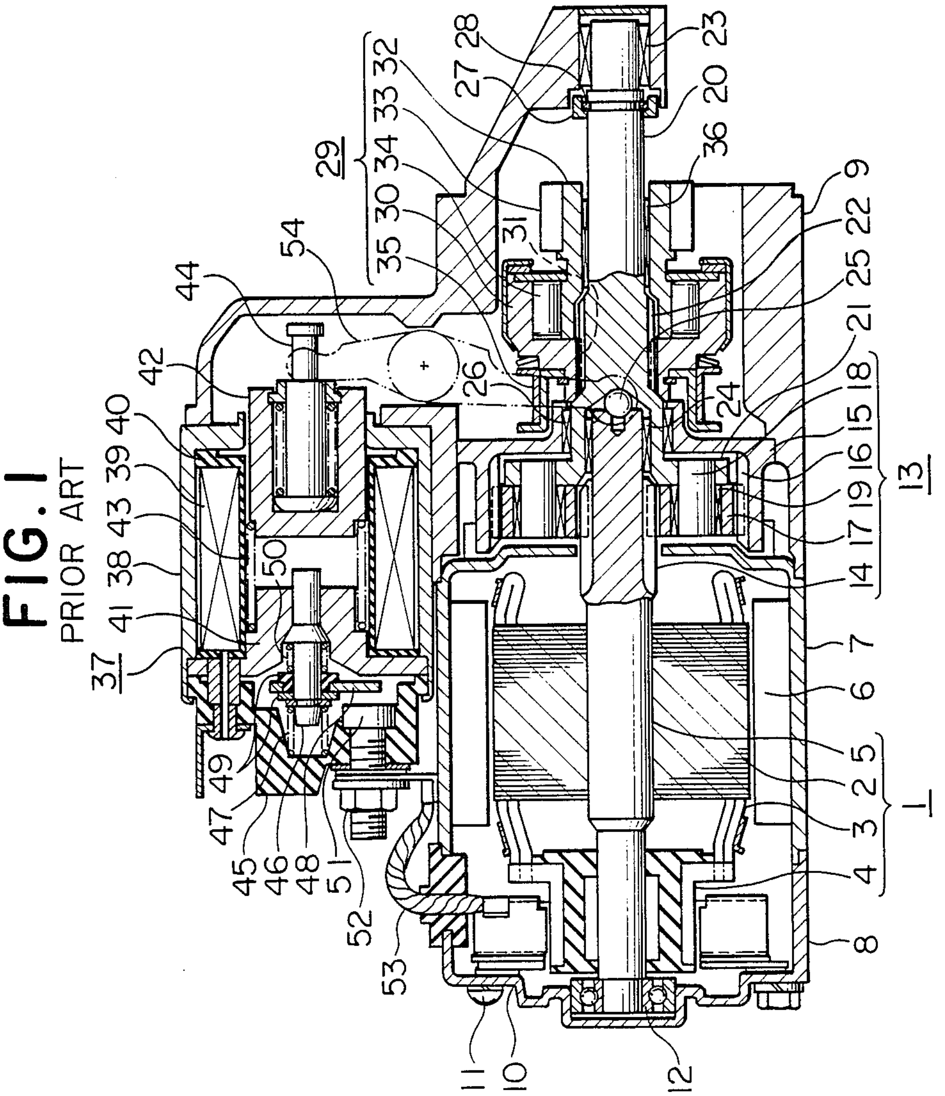
FIG. 1 PRIOR ART
FIG. 1 is a longitudinal sectional view of the convention starter motor.
Figure 2:
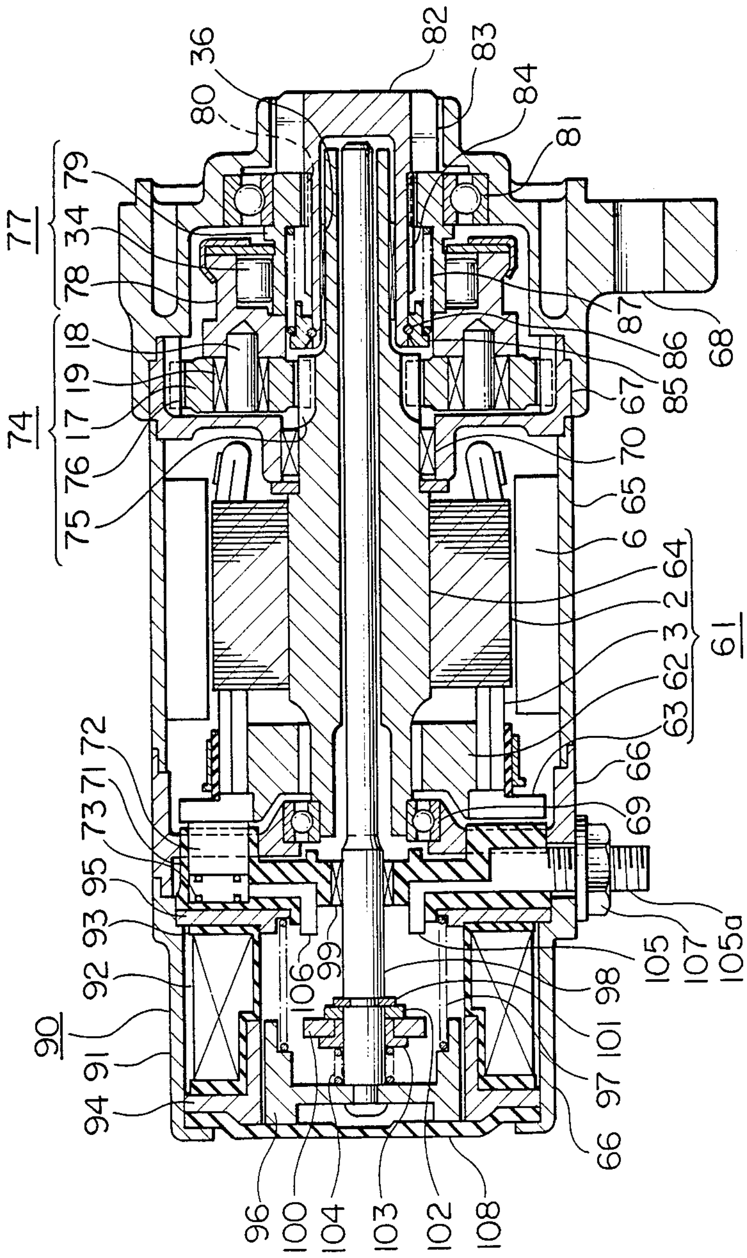
FIG. 2 is a longitudinal sectional view of one embodiment of a coaxial starter motor of the present invention.

FIG. 2 illustrates in a longitudinal sectional view one embodiment of the coaxial starter motor of the present invention. The coaxail starter motor comprises an armature 61 of the d.c. motor in which the armature coil 3 is mounted on the armature iron core 2 and is connected to commutator segments 63 of a commutator 62. The armature 61 comprises a hollow rotary shaft 64 on which the armature iron core 2 and the commutator 62 are secured thereon. A plurality of magnetic pole pieces 6 made of permantent magnets are mounted to a yoke 65, to which a rear bracket 66, a stationary frame 67 and a front bracket 68 are mounted. The rotary shaft 64 is supported at its rear end by a bearing 69 on the rear bracket 66 and at the intermediate portion by a bearing 70 on the sationary frame 67. Also mounted to the rear bracket 66 is a brush holder 71 made of an electrically insulating molded material such as a synthetic resin for axially movably supporting a brush 72 biased by a compression spring 73.

The coaxial starter motor comprises a planetary gear speed reduction unit 74 including a spur sun gear 75 formed on the outer circumference of the rotary shaft 64 and an inner gear 76 formed on the inner circumference of the large-diameter portion of the stationary frame 67. A plurality of planetary gears 17 are rotatably supported on the support pins 18 by the bearing 19 so that they mesh with the spur gear 75 and the inner gear 76 to rotate and spin. The support pins 18 are mounted on a clutch outer member 78 which will be described later for transmitting the rotation.

An over-running clutch 77 for transmitting the speed-reduced rotation from the planetary gear speed reduction unit 74 is also provided which transmits unidirectional rotational movement from a clutch outer member 78 to a clutch inner member 79 through a plurality of rollers 34. The clutch inner member 79 has formed on the front portion of the inner circumference helical splines 80 and is supported by the front bracket 68 through a bearing 81.

An output sleeve 82 is supported by the bearing 36 on the front end portion of the rotary shaft 64 in a relatively rotatable and axially movable relationship with respect to the rotary shaft 64. The output sleeve 82 has a pinion 83 on the outer circumference of its front end and helical splines 84 formed on the outer circumference of its mid-rear portion of for engagement with the helical splines 80 of the clutch inner member 79 and is rotated to provide an output.

The output sleeve 82 is provided with a stopper 85 connected at the outer circumference of the rear end by an engagement ring 86, and the output sleeve 82 is urged to its return position by a return spring 87 disposed between the inner sleeve 79 and the sopper 85.

The coaxial starter motor further comprises a solenoid switch 90 including a switch case 91 mounted to the rear bracket 66 for serving as a yoke, and an excitation coil 92 wound on a bobbin 93 made of a synthetic resin and housed in a the case 91. The solenoid switch 90 also comprises an iron core 94 secured to the rear end of the case 91 for defining a magnetic path, a stationary core 95 secured to the front end of the case 91, and a plunger 96 serving as a movable core disposed within the core 94 in an axially movable relationship, the plunger 96 being urged to its return position by a return spring 97 mounted between the stationary core 95 and the plunger 96. Secured to the plunger 96 at its rear end is a movable rod 98 which extends through the hollow portion of the rotary shaft 64 and is supported on the brush holder 71 by a bearing 99, the front end of the plunger 96 opposing the inner surface of the front end of the output sleeve 82. A movable contact 100 is supported between an insulating washer 102 and an insulating washer 103 supported by a stop ring 101 on the movable rod 98 and is biased by a compression spring 104. A pair of stationary contacts 105 and 106 are embedded within and supported by the brush holder 71. One of the stationary contact 105 extends to the exterior of the housing to provide a threaded main circuit terminal 105*a* to which a nut 107 is thread engaged, and the other stationary contact 106 is connected to the brush 72. An end cover 108 is mounted to the outer end of the swtich case 91.

When it is desired to start an engine, an ignition switch (not shown) is closed to energize the excitation coil 92, so that the plunger 96 is magnetically attracted to the stationary iron core 95. This causes the movable contact 100 to engage the stationary contacts 105 and 106 and the armature coil 3 is energized to rotate the armature 61. The rotation of the rotary shaft 64 is speed-reduced by the planetary gear speed reduction unit 74 and is transmitted to the over-running clutch 77, thereby rotating the output sleeve 82.

On the other hand, the forward movement due to the magnetic attraction of the plunger 96 causes the movable rod 98 to be advanced, and its front end abuts against the front end inner surfaces of the output sleeve 82 to advance it. Thus, the pinion 83 is brought into mesh with the ring gear of the flywheel (not shown) of the engine and start the engine.

Figure 3:
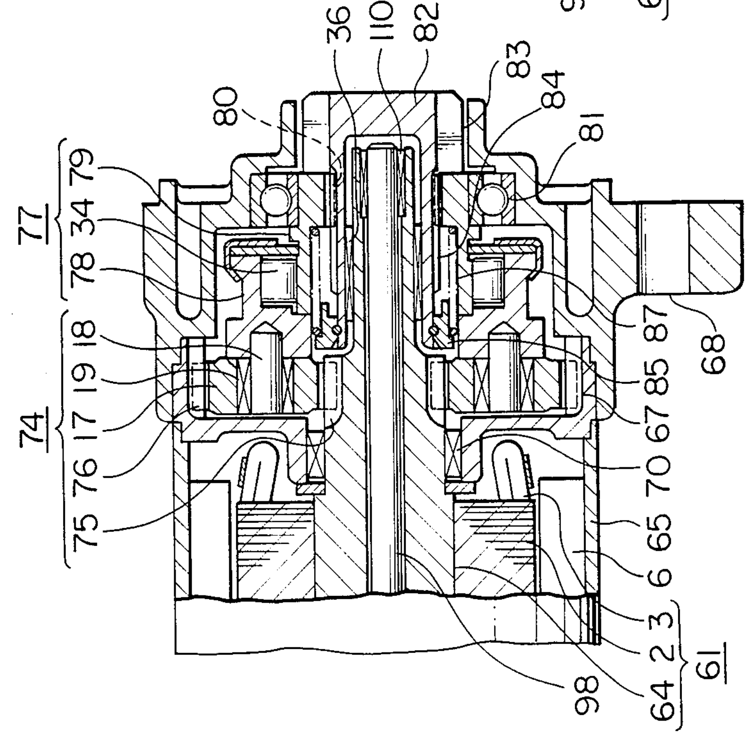
FIG. 3 is a longitudinal sectional view of the front half of another embodiment of the starter motor of the present invention.

FIG. 3 shows another embodiment of the coaxial starter motor of the present invention in which the front end of the movable rod 98 is rotatably supported by the front end central bore formed in the rotary shaft 64 through a bearing 110.

Figure 4:
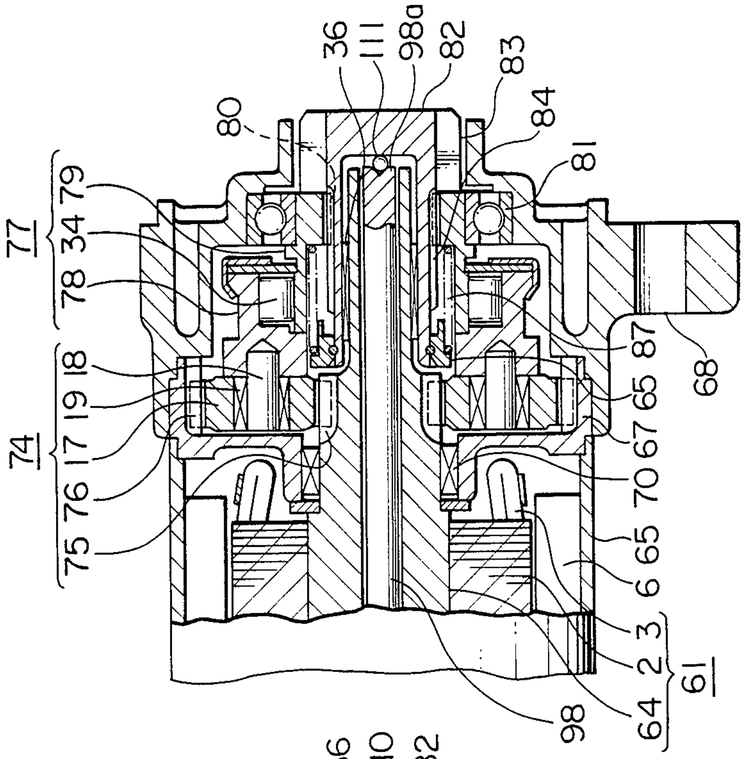
FIG. 4 is a longitudinal sectional view of the front half of still another embodiment of the starter motor of the present invention.

FIG. 4 illustrates still another embodiment of the coaxial starter motor of the present inventio in which the front end of the movable rod 98 has formed therein a recess 98*a* for receiving a steel ball 111 between it and the inside surface of the front wall of the output sleeve 82 so that the frictional resistance between the movable rod 98 and the output sleeve 82.

Figure 5:
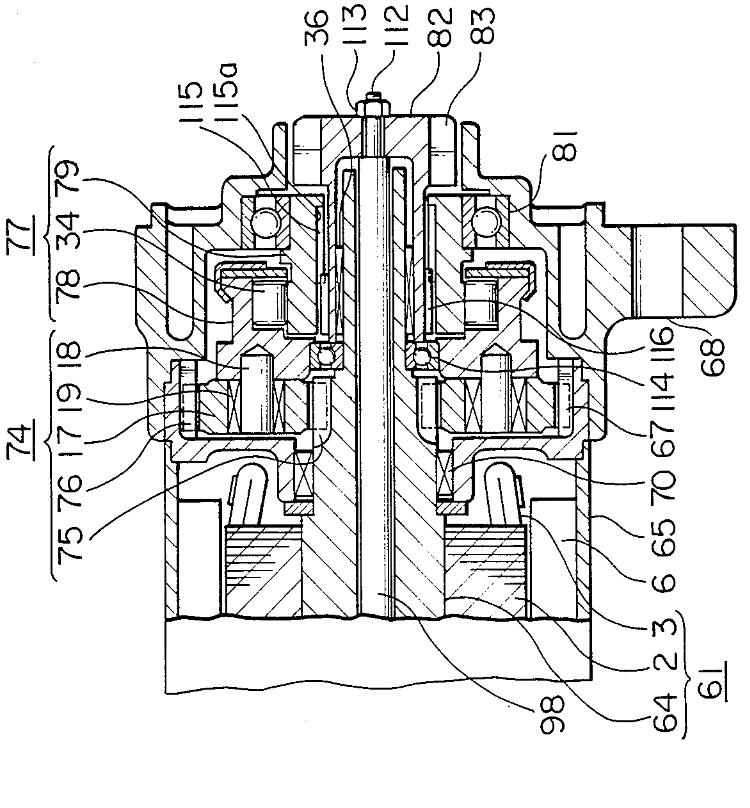
FIG. 5 is a longitudinal sectional view of the fron half of further embodiment of the starter motor of the present invention.

FIG. 5 illustrates another embodiment of the coaxial starter motor of the present invention. The movable rod 98 has at its front end a threaded reduced-diameter portion 112 extending through and secured by a nut 113 to the front wall of the movable rod 98. Therefore, the output sleeve 82 and the movable rod 98 are moved forward and backward together. The starter motor further includes a bearing 114 for supporting the clutch outer member 78 on the rotary shaft 64, which improves the accuracy of the center position of the planetary gears 17.

Figure 6:
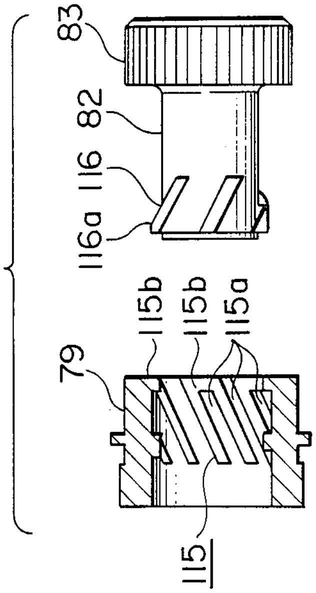
FIG. 6 is a longitudinal sectional view of the inner and output sleeves shown in FIG. 5.

The clutch inner member 79 of the over-running clutch 77 has helical splines 115 of which grooves 115*a* has a front end receiving portion 115*b* in every other grooves 115*a* as shown in FIG. 6. The length of helical splines 116 of the output sleeve 82 corresponding to the helical splines 115 of the clutch inner member 79 is selected so that the front end thereof engages by a small portion with the rear end of the grooves 115*a* of the helical splines of the clutch inner member 79 at its returned position as shown in FIG. 4. The output sleeve 82 has helical splines 116 having ridges 116*a* of the number equal to one half of the number of the ridges of the helical splines 115 of the clutch inner member 79 as shown in FIG. 6.

Figure 8:
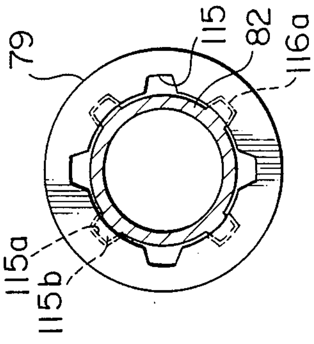
FIGS. 7 and 8 are front views of the inner sleeve and the output sleeve showing the steps of their assembly.
Figure 7:
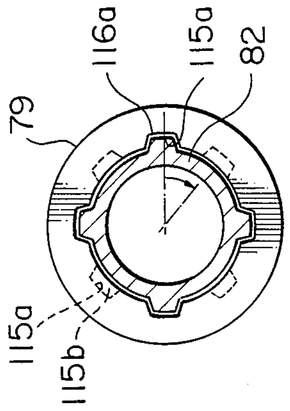

In order to assemble the output sleeve 82 into the clutch inner member 79, the output sleeve 82 is inserted into the clutch inner member 79 with the ridges 116*a* placed in the first grooves 115*a* which extend over the entire length of the clutch inner member 79 as shown in FIG. 7 until the ridges 116*a* passes through the grooves 115*a*. Then, the output sleeve 82 is turned by an angle corresponding to one pitch of the grooves 115*a* and the ridges 116*a* of the output sleeve 82 are slightly inserted into the shorter grooves 115 with the front end 115*b* to the position shown in FIG. 8. This assembly is incorporated with this position as shown in FIG. 5. Thus, the output sleeve 82 abuts against the bearing 114 to be positioned when it is returned to the original position. When the output sleeve 82 is advanced, the front ends of the ridges 116*a* of the helical splines 116 are engaged by the front end receiving portion 115*b* of the grooves 115*a* of the helical splines 115 of the clutch inner member 79, thereby the position of the output sleeve 82 is limited.

Thus, the stopper 85, the engagement ring 86 and the return spring 87 used in the embodiment showin in FIG. 2 can be removed.

As has been described, according to the present inveniton, the coaxial starter motor comprises a d.c. motor having a hollow rotary shaft extended forward and a planetary speed reduction gear having a sun gear disposed on the outer periphery of the rotary shaft. The starter motor comprises an over-runing clutch of which inner sleeve rotates in one direction and is provided at the inner circumference with helical splines, the over-runing clutch being disposed on the front side of the rotary shaft and rotated at a reduced speed by the planetary gear speed reduction gear. Also provided is an output sleeve mounted on the front end portion of the rotary shaft and having a pinion at its front end portion and axially movably and relatively rotatably supported by a bearing, in which helical splines formed close to the rear portion of the outer periphery is in mesh with helical splines of the inner sleeve. A solenoid switch is disposed on the rear end portion of the d. c. motor, the solenoid switch having an excitation coil, a plunger electromagnetically moved forward when a current flows through the excitation coil, a movable rod connected to the plunger and extending into a hollow bore of the rotary shaft to oppose the front wall inner surface of the output sleeve at its front end, the movable rod being moved forward by the forward movement of the plunger to move forward the output sleeve, and a movable contact engageable with a stationary contact by the forward movement of the movable rod for supplying an electrical power to the armature.

When the excitation coil of the solenoid switch is energized, the movable contact is brought into contact with the stationary contact to energize the electric motor. The rotation of the motor armature shaft is reduced by the planetary gear speed reduction unit and transmitted to the output sleeve to rotate it. At the same time, the plunger of the solenoid swtich is moved forward to push forward the movable rod until it abuts against the inner surface of the front end inner surface of the output sleeve. This causes the pinion to be brought into mesh with the ring gear of the engine flywheel.

Therefore, the overall height of the starter motor is relatively small, requiring only a relatively small space for installation. Also, the structure is simple because the output shaft and the shift lever are not neccessary, and the starter motor is small in height and requires only a relatively small installation space. Also, the number of components of the starter motor is reduced, making assembly easy. Further, modification of the outer diameter and/or the number of teeth of the pinion can be relatively easily achieved.

What is claimed is:

1. A coaxial starter motor comprising:

a d.c. motor having a hollow rotary shaft extended forward;

a planetary speed reduction gear having a sun gear which is a spur gear disposed on the outer periphery of the intermediate portion of said rotary shaft;

an overruning clutch in which an inner sleeve is arranged to be rotated in one direction and helical splines are formed in the inner periphery of said inner sleeve, said over-runing clutch being disposed on the front side of said rotary shaft and rotated at a reduced speed by said planetary gear speed reduction gear;

an output sleeve mounted on the front end portion of said rotary shaft and having a pinion at its front end portion and axially movably and relatively rotatably supported by a bearing, in which helical splines formed close to the rear portion of the outer periphery is in mesh with helical splines of said inner sleeve; and a solenoid switch disposed on the rear end portion of said d.c. motor, said solenoid switch having an excitation coil, a plunger electromagnetically moved forward when a current flows through said excitation coil, a movable rod operatively associated with said plunger and extending into a hollow bore of said rotary shaft to oppose the front wall inner surface of said output sleeve at its front end, said movable rod being moved forward by the forward movement of said plunger to move forward said output sleeve, and a movable contact engageable with a stationary contact by the forward movement of said movable rod for supplying an electrical power to said armature.

2. A coaxial starter motor as claimed in claim 1, wherein a stopper is disposed on an outer periphery of a rear end portion of said output sleeve and a return spring is axially disposed between said stopper and said inner sleeve, the arrangement being such that said inner sleeve abuts at an inner periphery of an inner end face of a reduced diameter portion of said inner sleeve against said stopper to be prevented from moving further forward when said output sleeve moves forward, and that said output sleeve is returned to its original position by said return spring.

3. A coaxial starter motor as claimed in claim 1, wherein said movable rod is supported at its front end portion through a bearing by the front end portion of the central bore of said rotary shaft.

4. A coaxial starter motor as claimed in claim 1, wherein a steel boll is provided between the front end of said movable rod and the inner surface of the front end wall of said output sleeve.

5. A coaxial starter motor as claimed in claim 1, wherein every other grooves of the helical spline formed in the clutch inner member has a front end engaging portion, the number of the ridges of the helical splines of said output sleeve is one half of the number fo the ridges of the splines of the clutch inner member, the ridges of the splines of said output sleeve are in mesh with the grooves having said front end engaging portion, so that the forward movement of said output sleeve is limited by the engagement of fron end of the ridge of the splines of said output sleeve against said front end engaging portions of the grooves of the splines of said clutch inner member, and wherein the front end of said movable rod is connected to a front end wall of said output sleeve.

6. A coaxial starter motor as claimed in claim 1, wherein said outer sleeve is supprted on a rotary shaft through a bearing, so that when said output sleeve moves rearward its rear end face abuts against an end face of said bearing to restrict the return position.

* * * * *